United States Patent
Horikiri

(12) 
(10) Patent No.: US 6,645,577 B2
(45) Date of Patent: Nov. 11, 2003

(54) LIQUID CRYSTAL COMPOSITION AND LIQUID CRYSTAL DEVICE AND LIQUID CRYSTAL APPARATUS INCLUDING THE COMPOSITION

(75) Inventor: Tomonari Horikiri, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 09/900,884

(22) Filed: Jul. 10, 2001

(65) Prior Publication Data

US 2002/0070373 A1 Jun. 13, 2002

(30) Foreign Application Priority Data

Jul. 12, 2000 (JP) .......................... 2000-210968

(51) Int. Cl.[7] .................. C09K 19/34; C09K 19/32; C09K 19/56; G02F 1/133
(52) U.S. Cl. ............. 428/1.1; 252/299.01; 252/299.62; 252/299.66; 252/299.5
(58) Field of Search .............. 428/1.1; 252/299.62, 252/299.66, 299.01, 299.5

(56) References Cited

U.S. PATENT DOCUMENTS

| | | | |
|---|---|---|---|
| 6,017,465 A | 1/2000 | Naito ................ | 252/299.01 |
| 6,074,710 A | 6/2000 | Kato et al. ............ | 428/1.5 |
| 6,171,600 B1 * | 1/2001 | Dahms ................ | 424/401 |
| 6,333,081 B1 * | 12/2001 | Horikiri et al. ........ | 428/1.1 |

FOREIGN PATENT DOCUMENTS

| | | |
|---|---|---|
| JP | 8-254688 | 10/1996 |
| JP | 9-234984 | 9/1997 |
| JP | 9-243984 | 9/1997 |
| JP | 11-2802 | 1/1999 |
| JP | 11-21556 | 1/1999 |
| JP | 11-52341 | 2/1999 |
| JP | 11-256164 | 9/1999 |

OTHER PUBLICATIONS

CAPLUS 1999: 559232.*
Ide et al., "Gelation of Fully Acylated Cellobiose in Alkane Solution", Bull. Chem. Soc. Japan, vol. 68, pp. 3423–3428, 1995.*
Schadt, "Novel supertwisted nematic liquid crystal display operating modes and . . . ", SPIE vol. 1455 Liquid–Crystal Devices and Materials (1991), pp. 214–224.

* cited by examiner

Primary Examiner—Shean C. Wu
(74) Attorney, Agent, or Firm—Fitzpatrick, Cella, Harper & Scinto

(57) ABSTRACT

A liquid crystal composition is principally constituted by at least a liquid crystal and a gel-forming compound which forms a gel with the liquid crystal. The gel-forming compound has a discotic liquid crystal phase and assumes a supermolecular structure when it is mixed with the liquid crystal. The supermolecular structure may preferably have at least one intermolecular interacting side having at least one —CONH— group allowing multi-dimensional intermolecular interaction.

9 Claims, 2 Drawing Sheets

LIQUID CRYSTAL COMPOSITION AND LIQUID CRYSTAL DEVICE AND LIQUID CRYSTAL APPARATUS INCLUDING THE COMPOSITION

BACKGROUND OF THE INVENTION

The present invention relates to a liquid crystal composition and to a liquid crystal device and liquid crystal display apparatus using the liquid crystal composition. More specifically, the present invention relates to a liquid crystal composition comprising a liquid crystal and a gel-forming compound which forms a gel with the liquid crystal and having a discotic liquid crystal phase and assuming a supermolecular structure, as well as to a liquid crystal device and liquid crystal display apparatus using the liquid crystal composition.

With the development of information equipment, societal need for a low power consumption-type thin display device has considerably increased in recent years. In order to meet such a need, a liquid crystal display device as a device with a smaller thickness and a lower power consumption has been extensively developed. Particularly, liquid crystal display devices using a nematic liquid crystal or a ferroelectric liquid crystal have already been commercialized.

Such a liquid crystal composition, however, generally requires many constituent compounds in a mixture in order to enlarge the mesomorphic temperature range and driving (voltage-transmittance) and optical characteristics, thus necessitating accumulated experiences or experiments and a complicated mixing step of many constituent compounds possessing different physical and mesomorphic properties. Further, when a color display is performed, a liquid crystal device using the liquid crystal composition is required to employ an additional member, such as a color filter, thus resulting in a complicated device structure.

In recent years, many liquid crystal compositions comprised of a relatively smaller number of components have been proposed.

Specifically, a liquid crystal composition comprising a low molecular weight liquid crystal and a low molecular weight amorphous compound and having a structure such that the low molecular weight amorphous compound forms a domain of a network structure via hydrogen bonds and the low molecular weight liquid crystal is dispersed in the domain has been proposed (Japanese Laid-Open Patent Application (JP-A) 8-254688). Liquid crystal compositions comprising a liquid crystal and a low molecular weight compound by which the liquid crystal is gelatinized have been proposed (JP-A 11-52341, JP-A 11-21556 and JP-A 11-256164). Further, a liquid crystal composition comprising a mixture of a rod-shaped liquid crystal with a dendrimer or a discotic liquid crystal has been disclosed (JP-A 9-234984).

With respect to a color liquid crystal device without a color filter, many studies thereon have been made since a report as to a cholesteric liquid crystal device by Martin Sohadt et al., "Liquid-Crystal Device and Materials", vol. 1455, pp. 214–224 (1991) and include, e.g., one regarding a liquid crystal composition comprising a nematic liquid crystal and a chiral dopant (agent) added thereto. According to these liquid crystal devices, it is possible to effect selective reflection based on a helical structure of aligned liquid crystal molecules, thus allowing color display. The color display has also been realized by using holography (e.g., JP-A 11-2802).

However, these documents have encountered the following difficulties.

JP-A 8-254688 requires an amount of at least 10 wt. % of the low molecular weight amorphous compound for forming the network structure. According to JP-A 11-52341, JP-A 11-21556 and JP-A 11-256164, it has been reported that it is possible to effect alignment control of liquid crystal molecules by utilizing hydrogen bonds formed between self-assembly (association) type molecules, but actual molecular structures have not been confirmed. Further, JP-A 9-243984 has reported that it is possible to effect a low voltage drive, but it is silent about an improvement in contrast.

The above-mentioned color liquid crystal devices using the cholesteric liquid crystal, the nematic liquid crystal doped with the chiral dopant and holography generally require a three-layer structure comprising, e.g., cholesteric liquid crystal layers of red (R), green (G) and blue (B) disposed in succession to effect multi-color display based on material control manner, thus failing to provide multi-color display states based on an electrical drive scheme. As a result, such color liquid crystal devices have a complicated cell structure and fail to attain optical advantages.

SUMMARY OF THE INVENTION

In view of the above problems, a principal object of the present invention is to provide a liquid crystal composition, device and display apparatus having solved the above problems.

A specific object of the present invention is to provide a liquid crystal composition lowered in flowability of liquid crystal molecules originally showing fluidity by using a discotic gel-forming compound capable of forming a supermolecular structure.

Another object of the present invention is to provide a liquid crystal device and liquid crystal display apparatus using the liquid crystal composition capable of increasing a contrast and controlling color display states based on selective reflection or transmittance of light by electrical control of voltage, frequency, etc.

According to the present invention, there is provided a liquid crystal composition comprising: at least a liquid crystal and a gel-forming compound forming a gel with the liquid crystal, wherein the gel-forming compound has a discotic liquid crystal phase.

According to the present invention, there is also provided a liquid crystal device comprising: a pair of electrodes and a liquid crystal composition disposed between the electrodes, wherein the liquid crystal composition comprises at least a liquid crystal and a gel-forming compound forming a gel with the liquid crystal, said gel-forming compound having a discotic liquid crystal phase.

According to the present invention, there is further provided a liquid crystal display apparatus using the liquid crystal device.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
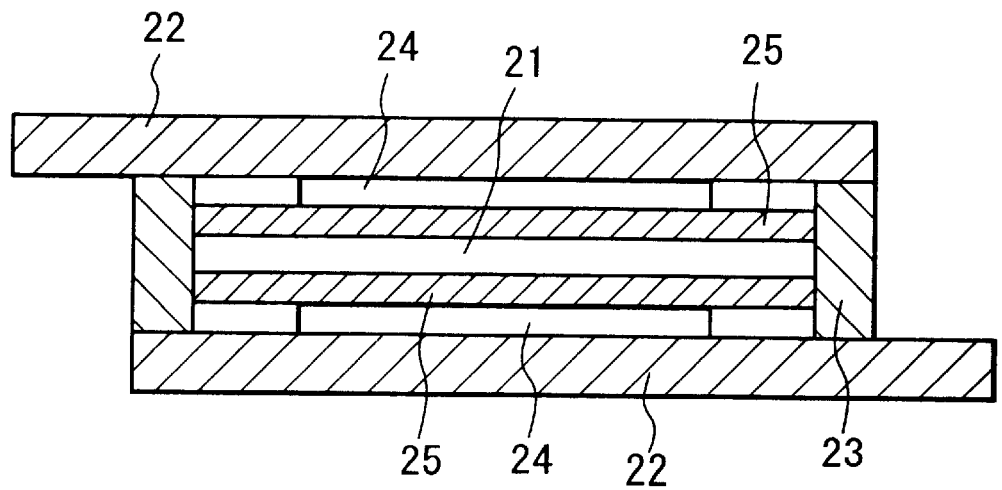
FIG. 1 is a schematic sectional view of an embodiment of the liquid crystal device according to the present invention.

The liquid crystal composition according to the present invention comprises at least a liquid crystal and a gel-forming compound which forms a gel with the liquid crystal. The gel-forming compound is characterized by its assumption of a discotic liquid crystal phase.

Herein, the term "the gel-forming compound (having a discotic liquid crystal phase)" means a compound assuming a supermolecular structure comprising a three-dimensional structure constituted by fibrous associated molecules regularly aligned or oriented in a particular direction when it is mixed with the liquid crystal. Specifically, the gel-forming compound is a compound capable of forming a supermolecular structure or an associated structure of fibrous molecules of the gel-forming compound possessing a geometrical order by the interaction of a relatively weak force exerted between the fibrous molecules (intermolecular interaction) in the liquid crystal composition with the liquid crystal, i.e., a self-organizing or self-assembly (aggregation) compound. Such a weak intermolecular interaction is different from covalent bond forming a firmly bonded state between molecules based on sharing of electrons by a pair of atoms. Examples of the weak intermolecular interaction may include non-covalent bonds, such as hydrogen bonds, ionic bonds, hydrophobic bonds, electrostatic forces, van der Waals forces and charge-transfer interactions. The bonding forces of these non-covalent bonds are generally one-several tenth of that of the covalent bond. However, when many bonding points of the non-covalent bonds are formed, the resultant structure has a considerably firm aggregation or assembly structure. It has been known that this aggregation structure causes gelation of liquid by the addition of a small amount thereof because the aggregation structure allows for the formation of a fibrous association structure. This may be attributable to a phenomenon such that molecules of the fibrous association structure are mutually tangled in a network form to lose their flowability and fluid (liquid) is incorporated in the resultant network structure to provide a gel state.

Further, in the field of biology, it has been known that strictly organized molecular complexes or films are formed by selective association as in supermolecules, such as the structure formation of a cell, various metabolic processes (e.g., enzyme reaction) and information transmissions (e.g., association of DNA (deoxyribonucleic acid)), with respect to an organism. As a result, a new function and/or highly positional-selective or stereo-selective reaction which is not observed in the case of respective constitutional elements alone is realized. It is also possible to provide properties or a structure capable of effecting self-repairing or chemical reaction very efficiently by appropriately changing the supermolecular structure, as desired. Thus, by forming the supermolecular structure, it becomes possible to attain a strict ordered-structure or a new function which has not been achieved by a conventional polymer based on covalent bonds.

Accordingly, the gel-forming compound forming the above-mentioned supermolecular structure (fibrous association structure) different in molecular alignment state from a three-dimensional cross-linked structure of conventional polymers and random network chain structures via hydrogen bonds of natural polymers, such as agar and gelatin, is expected to exhibit flexible and delicate functions based on the ordered or regularly aligned molecular structure of the molecules of the gel-forming compound in the liquid crystal composition.

In the present invention, in addition to the above-mentioned supermolecular structure, by providing the gel-forming compound with a self-alignment (orientation) property and providing another substance (liquid crystal) with an alignment control force of the gel-forming compound, it is possible to effect alignment control of the liquid crystal of the gel-forming compound aligned in a certain direction or alignment control of the gel-forming compound by the liquid crystal aligned in a certain direction, and it also becomes possible to fix a resultant three-dimensional supermolecular structure of the gel-forming compound in the liquid crystal composition by gelation.

The liquid crystal used in the liquid crystal composition of the present invention is not particularly restricted in its species and structure but may preferably be a low molecular weight liquid crystal. In a preferred embodiment, the liquid crystal may preferably be a liquid crystal substance capable of providing a resultant liquid crystal composition with nematic phase and/or smectic phase in an operation temperature range of a display device using the liquid crystal composition. For that purpose, the liquid crystal may be a liquid crystal mixture (composition) of two or more species of liquid crystal substances.

The liquid crystal composition of the present invention may further comprise additives, such as electrolyte, stabilizer, etc., as desired. These additives may be known compounds and are not particularly restricted in their structures and species so long as the additives show desired mutual solubility or interaction with the liquid crystal material used.

In the liquid crystal composition, a mixing ratio of the above-mentioned component compounds is also not restricted particularly but may preferably be selected appropriately so as to be suitable in the case of adversely affecting a contrast and/or optical characteristics of a resultant display device (apparatus).

The gel-forming compound used in the liquid crystal composition of the present invention shows a discotic liquid crystal phase and gelling ability or power. In the discotic liquid crystal phase, disk-shaped liquid crystal molecules, each comprising a plate-shaped core portion consisting of, e.g., at least one aromatic ring to which at least one (preferably plural) long side chain is connected, are aligned or oriented in such a manner that liquid crystal molecular planes (disks) (perpendicular to a director direction thereof) are oriented in a substantially same direction, but a positional relationship thereof is irregular (referred to as "discotic nematic phase") or liquid crystal molecular planes are orderly stacked in a columnar shape (referred to as "discotic columnar phase"). In the present invention, the gel-forming compound may preferably assume discotic columnar phase rather than discotic nematic phase.

Further, in order to improve the gelling ability or intermolecular interaction function, the gel-forming compound may preferably have at least one intermolecular interacting site allowing multi-dimensional (three-dimensional) intermolecular interaction. The intermolecular interacting site may, e.g., comprise a hydrogen bond-forming substituent, such as —CONH— group, carbamate group, amide group, urea group, carboxyl group, alkoxy group, hydroxyl group or phosphoric acid group, particularly —CONH— group. The number, species and structural position of the hydrogen bond-forming substituent are not limited particularly. Further, in order to realize the gelation or self-organization, the resultant association structure from the gel-forming compound may have a helical structure and may change its structure by application of an electric field (i.e., electric field response).

Examples of the above-mentioned gel-forming compound may include a benzenetriamide compound represented by formula (1) shown below, a benzendiamide compound represented by formula (2) shown below, and a trimericamide derivative with peripheral olygoethylene oxide side chains represented by formula (3) shown below.

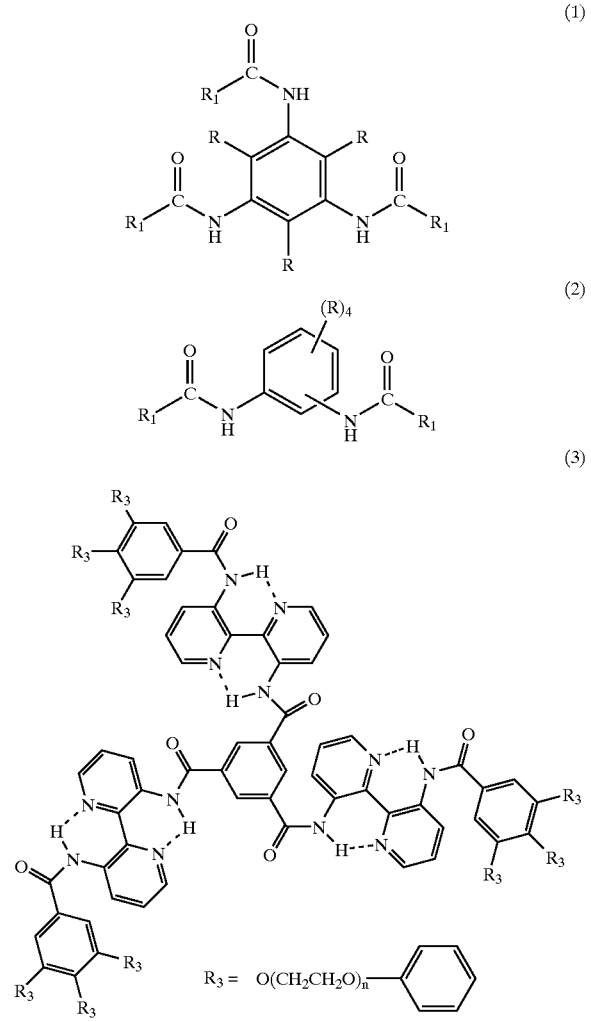

In the above formulas (1), (2) and (3), R and $R_1$ independently represent hydrogen or a hydrocarbon group having 1–29 carbon atoms, and n denotes an integer of at least 1.

The gel-forming compound used in the liquid crystal composition of the present invention may be dissolved in the liquid crystal irrespective of the application of external energy such as heating. Further, irrespective of dissolution state, the gel-forming compound may be precipitated in the liquid crystal composition as a crystal having a size such that a resultant display device using the liquid crystal composition causes no appearance failure in an operation temperature range thereof. The gel-forming compound may be combined with the liquid crystal to form a composite material having a new supermolecular structure. In view of the above conditions, the liquid crystal composition of the present invention may preferably comprise the gel-forming compound in an amount of 1–50 wt. %, more preferably 5–35 wt. %.

The gelation of the liquid crystal (composition) may be confirmed by using an ordinary inverted test tube method (described later).

The gelation may generally be performed by a method wherein a liquid crystal and a gel-forming compound are stirred under heating to form a uniform solution, followed by gradual cooling to cause gelation, a method wherein a liquid crystal and a gel-forming compound are dissolved in a solvent, followed by distilling-off of the solvent to cause gelation, or a method wherein a liquid crystal and a gel-forming compound are blended and subjected to external stimulus such as ultrasonic treatment to cause gelation. In the present invention, the first method may preferably be adopted in view of its absence of the addition of another additive and its simple production process. The gelation mechanism may be assumed that molecules of the discotic gel-forming compound strongly and three-dimensionally interact with each other (intermolecular interaction) when mixed with a liquid crystal, thereby forming a fibrous associated structure into which the liquid crystal is incorporated and loses its flowability.

In the present invention, various analyzing methods may be employed in order to clarify the structure of the gel-forming compound. Examples of such analyzing methods may include infrared spectroscopic analysis using variable heat energies, differential scanning calorimetry (DSC), observation with polarizing microscope, x-ray diffraction analysis, observation with scanning electron microscope (SEM) and observation with transmission electron microscope (TEM). For instance, it is possible to determine temperatures of generation and extinction for phase transition peaks by the DSC and polarizing microscope observation and determine a change in crystal diffraction due to the formation of a composite structure. Further, it is possible to confirm that the extinction or shift of peaks for a substituent having a non-covalent bond due to a temperature change are identified by the infrared spectroscopic analysis. As a result, it is possible to determine the supermolecular structure of the gel-forming compound (and the liquid crystal). In addition, the observation through the SEM and/or TEM allows confirmation of a network structure comprising a strictly ordered structure based on the supermolecular structure.

In a preferred embodiment, during the formation of the supermolecular structure by gradually cooling a mixture (composition) of the liquid crystal and gel-forming compound, a lower phase transition temperature substance is regulated in its alignment state by a higher phase transition temperature substance. For instance, when the supermolecular structure is formed in such a state that liquid crystal molecules are uniaxially aligned as in a nematic liquid crystal, the gel-forming compound is aligned by an alignment control force of the liquid crystal. Alternatively, when the supermolecular structure is formed in an isotropic liquid solution of the liquid crystal, the liquid crystal is aligned by the structure of the gel-forming compound. These alignment controls may be performed by appropriately selecting a combination of constituting materials of the liquid crystal composition and an addition amount of the gel-forming compound. Further, the alignment states of the gel-forming compound and the liquid crystal are also affected by an alignment control treatment of a cell. Accordingly, by appropriately combining cell forming conditions and supermolecular structure forming conditions, it becomes possible to prepare liquid crystal devices having different characteristics.

The liquid crystal device according to the present invention may have any known cell structure, but may preferably have a cell structure such that a light-control (optical control) layer comprising the above-mentioned liquid crystal composition is formed within a cell which has been subjected to homeotropic alignment treatment, whereby both the gel-forming compound and the liquid crystal are, e.g., placed in a homeotropic alignment state. In this case, when the liquid crystal is caused to be placed in a homogeneous alignment state, e.g., by application of an electric field, a stability of the homogeneous alignment state of the liquid crystal is enhanced by the alignment control force from the gel-forming compound having a discotic liquid crystal phase. As a result, directions of directors of the liquid crystal and the gel-forming compound are mutually different from each other, thus increasing a degree of light scattering to improve a contrast.

Hereinbelow, the present invention will be described more specifically based on examples with reference to the drawings.

SYNTHESIS EXAMPLE 1

In 70 ml of tetrahydrofuran (THF), 0.7 g of 1,3,5-benzenetricarboxylic acid and 2.5 g of stearylamine were dissolved. To the solution, 3.6 g of 1-ethyl-3-(3-dimethylaminopropyl) carbodiimide hydrochloride (WSC: water-soluble carbodiimide) and 2.52 g of 1-hydroxy-1H-benzotriazole (HOBT) were added, and then 5 ml of triethylamine (TEA) was added dropwise on an ice bath. After the addition, the mixture was stirred for 2 hours on the ice bath and further stirred at room temperature. The reaction mixture was recovered by filtration and dissolved in chloroform. Successive washings with diluted hydrochloric acid, sodium bicarbonate aqueous solution, and water followed. The product was dried with anhydrous sodium sulfate and recrystallized to obtain 4.0 g of an objective compound (4) shown below.

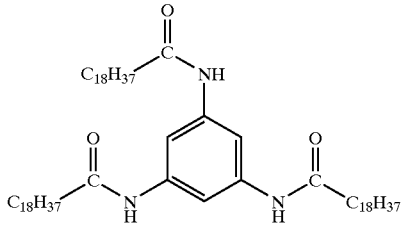

(4)

The compound (4) was heated and injected into a cell (cell gap: 5 μm, available from K.K. EHC), which had been subjected to homeotropic alignment treatment, and was subjected to differential scanning calorimetry (DSC) using a DSC apparatus ("DSC3100", mfd. by Mac Science) in combination with a temperature-control system ("Thermosystem FP90" mfd. by Mettler Co.) and a polarizing microscope ("OPTIPHOTO-PDL", mfd. by Nikon K.K.). As a result, the compound (4) showed a texture comprising a discotic columnar phase in a temperature range of 186–76° C. on temperature decrease.

SYNTHESIS EXAMPLE 2

A compound (5) shown below was synthesized through a reaction scheme shown below.

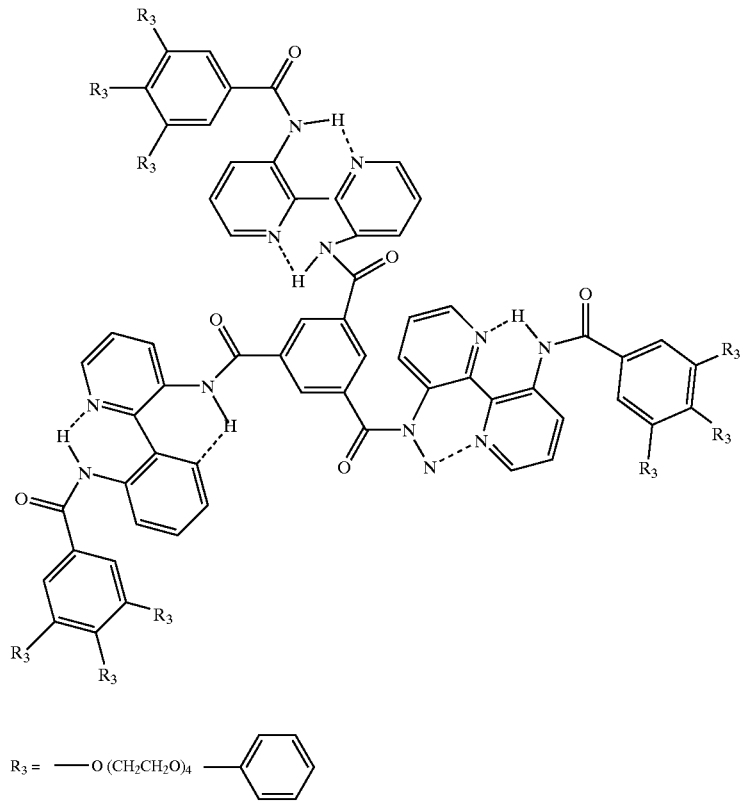

(5)

$R_3 = \text{—O(CH}_2\text{CH}_2\text{O)}_4\text{—}$

Reaction Scheme
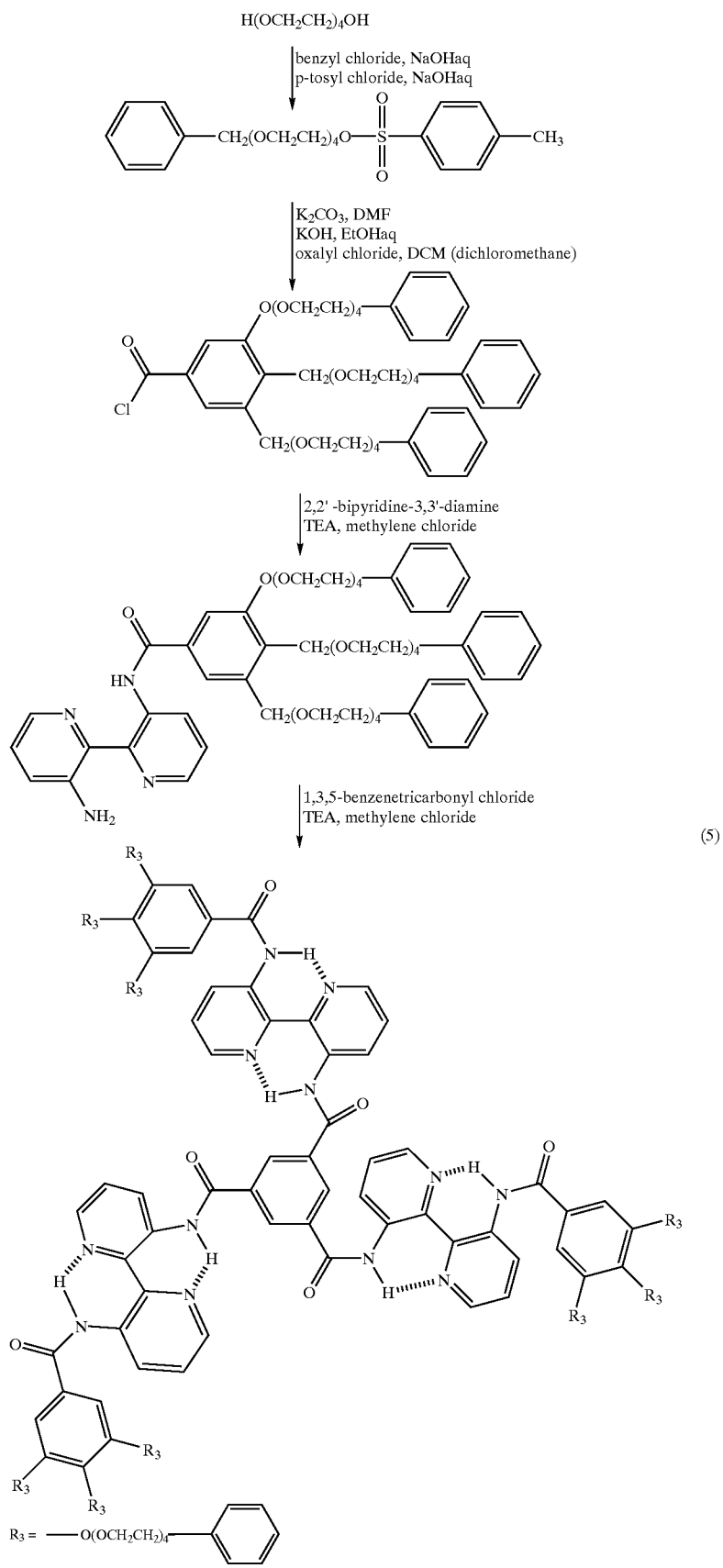

The compound (5) was subjected to DSC measurement as in Synthesis Example 1.

As a result, the compound showed a texture comprising a discotic columnar phase in a temperature range of 240° C. to −50° C. on temperature decrease.

EXAMPLES 1–12

Three species of nematic liquid crystals ("5CB" (nematic phase temp.=28–38° C.), mfd. by Aldrich Co.; "TL-216" (nematic-isotropic phase transition temp.=80° C.), mfd. by Merck Co.; and "DF01XX" (nematic-isotropic phase transition temp.=104° C.), mfd. by Chisso K.K.) and the above-prepared compounds (4) and (5) were blended as shown in Table 1 below. The mixtures was each dissolved in chloroform and subjected to ultrasonic treatment, followed by distilling-off of the solvent to prepare liquid crystal compositions LC-1 to LC-12, respectively.

After cooling the liquid crystal compositions LC-1 to LC-12 to room temperature, each liquid crystal composition was subjected to an inverted test tube method (a method wherein a prescribed amount of a sample is placed in a test tube, which is capped and turned upside down to observe whether the sample flows or not), thus confirming a gel state of all the liquid crystal compositions LC-1 to LC-12 as shown in Table 1.

As a result, it was found that a smaller amount (2 wt. % or 5 wt. %) of the gel-forming compound (compound (4) or (5)) caused gelation.

COMPARATIVE EXAMPLES 1–6

Comparative liquid crystal compositions LC-C1 to LC-C6 were prepared and subjected to the inverted test tube method in the same manner as in Examples 1–12 except that the compound (4) or (5) was changed to a low-molecular weight compound (6) (not providing a supermolecular structure) shown below. The results are shown in Table 1.

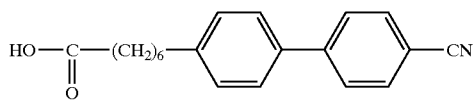
(6)

The comparative liquid crystal compositions LC-C1 to LC-C6 were not gelatinized.

When these liquid crystal compositions LC-C1 to LC-C6 were each injected into a cell and subjected to observation through a polarizing microscope as in Synthesis Example 1, the low-molecular weight compound (6) was found to be crystallized in a random direction in the respective liquid crystal compositions.

TABLE 1

| Ex. No. | LC No. | Liquid Crystal | Gel-forming compound No. | wt. % | Gelation* |
|---|---|---|---|---|---|
| 1 | 1 | 5CB | (4) | 2 | Gelled |
| 2 | 2 | 5CB | (4) | 5 | Gelled |
| 3 | 3 | TL-216 | (4) | 2 | Gelled |
| 4 | 4 | TL-216 | (4) | 5 | Gelled |
| 5 | 5 | DF01XX | (4) | 2 | Gelled |
| 6 | 6 | DF01XX | (4) | 5 | Gelled |
| 7 | 7 | 5CB | (5) | 2 | Gelled |

TABLE 1-continued

| Ex. No. | LC No. | Liquid Crystal | Gel-forming compound No. | wt. % | Gelation* |
|---|---|---|---|---|---|
| 8 | 8 | 5CB | (5) | 5 | Gelled |
| 9 | 9 | TL-216 | (5) | 2 | Gelled |
| 10 | 10 | TL-216 | (5) | 5 | Gelled |
| 11 | 11 | DF01XX | (5) | 2 | Gelled |
| 12 | 12 | DF01XX | (5) | 5 | Gelled |
| Comp. Ex. 1 | C1 | 5CB | (6) | 2 | Not gelled |
| Comp. Ex. 2 | C2 | 5CB | (6) | 5 | Not gelled |
| Comp. Ex. 3 | C3 | TL-216 | (6) | 2 | Not gelled |
| Comp. Ex. 4 | C4 | TL-216 | (6) | 5 | Not gelled |
| Comp. Ex. 5 | C5 | DF01XX | (6) | 2 | Not gelled |
| Comp. Ex. 6 | C6 | DF01XX | (6) | 5 | Not gelled |

*Gelled: the sample in the test tube did not flow when inverted.
Not gelled: the sample in the test tube flowed when inverted.

As a result of Examples 1–12 and Comparative Examples 1–6, the compounds (4) and (5) (gel-forming compounds) were found to be effective in gelatinizing a resultant liquid crystal composition and exerting an alignment control force on the liquid crystals (5CB, TL-216 and DF01XX).

EXAMPLES 13–24

Liquid crystal devices LCD-1 to LCD-12 were prepared by using the above-prepared liquid crystal compositions LC-1 to LC-12 (Examples 1–12), respectively, in the following manner.

A blank cell having a cell gap of 7 μm (available from K.K. EHC) and each liquid crystal composition were heated up to 190° C. At that temperature, the liquid crystal composition was injected into the blank cell by utilizing a capillary action, followed by gradual cooling to room temperature to prepare a liquid crystal device as shown in FIG. 1.

Referring to FIG. 1, the liquid crystal device comprises a pair of glass substrates 22, 200–300 μm thick transparent electrodes 24 of ITO (indium tin oxide) disposed on the substrates 22, polyimide alignment control films 25 for homogeneous alignment ("LX-1400", mfd. by Hitachi Kasei Kogyo K.K.; thickness=at most 200 Å) disposed on the ITO electrodes 24, and a liquid crystal layer 21 of the liquid crystal composition disposed between the alignment control films 25.

For comparison, three comparative liquid crystal devices LCD-C1 to LCD-C3 were prepared by injecting only liquid crystals (5CB, TL-216 and DF01XX), respectively, in place of each liquid crystal composition (a mixture of a liquid crystal and a gel-forming compound).

The thus-prepared liquid crystal devices LCD-1 to LCD-12 and comparative liquid crystal devices LCD-C1 to LCD-C3 were evaluated in terms of alignment and optical characteristics in the following manner.

Alignment Characteristic

An alignment state of each liquid crystal composition or liquid crystal in each liquid crystal device was observed through a polarizing microscope ("OPTIPHOTO-PDL", mfd. by Nikon K.K.; magnification=100) in combination with a temperature-control system ("Thermosystem FP 90", mfd. by Mettler Co.).

As a result of Example 15 using the liquid crystal composition LC-3 (Example 3), it was found that the liquid crystal (TL-216) was uniaxially homogeneously aligned, and the gel-forming compound (after gelation) was homeotropically aligned. In Example 16 using the liquid crystal composition LC-4 (Example 4), it was found that the liquid crystal (TL-216) was randomly aligned, and the gel-forming compound was somewhat homeotropically aligned.

In order to investigate the difference in alignment behavior more specifically, the respective phase transition behaviors for the liquid crystal compositions LC-3 and LC-4 on temperature decrease from isotropic liquid states were traced.

As a result of the liquid crystal composition LC-3 using a lower gel-forming compound content (2 wt. %) (Example 15 based on Example 3), it was confirmed that the liquid crystal (TL-216) first caused phase transition and was affected by the alignment control force of the homogeneous alignment control film to exhibit a uniaxial homogeneous alignment state, and then the gel-forming compound caused phase transition and received the alignment control force of the liquid crystal (TL-216) to be placed in a homentropic alignment state as its stable state in terms of energy. With respect to the liquid crystal composition LC-4 using a higher gel-forming compound content (5 wt. %) (Example 16 based on Example 4), it was confirmed that the gel-forming compound first caused phase transition to exhibit a homeotropic alignment state to some extent (including an irregularly aligned region) and then the liquid crystal (TL-216) caused phase transition and received the alignment control forces of the gel-forming compound and the homogeneous alignment control film to be placed in a random alignment state.

With respect to other examples (Examples 13, 14 and 17 to 24), similar results as in Examples 15 and 16 were attained.

According to these examples, it was found that an alignment state of a substance having a lower phase transition temperature was principally regulated by a substance having a higher phase transition temperature in a liquid crystal device using a liquid crystal composition comprising the lower and higher phase transition temperature substances.

On the other hand, in the comparative liquid crystal devices LCD-C1 to LCD-C3, it was found that a crystal free from an alignment control force was precipitated.

Optical Characteristic

Figure 2:
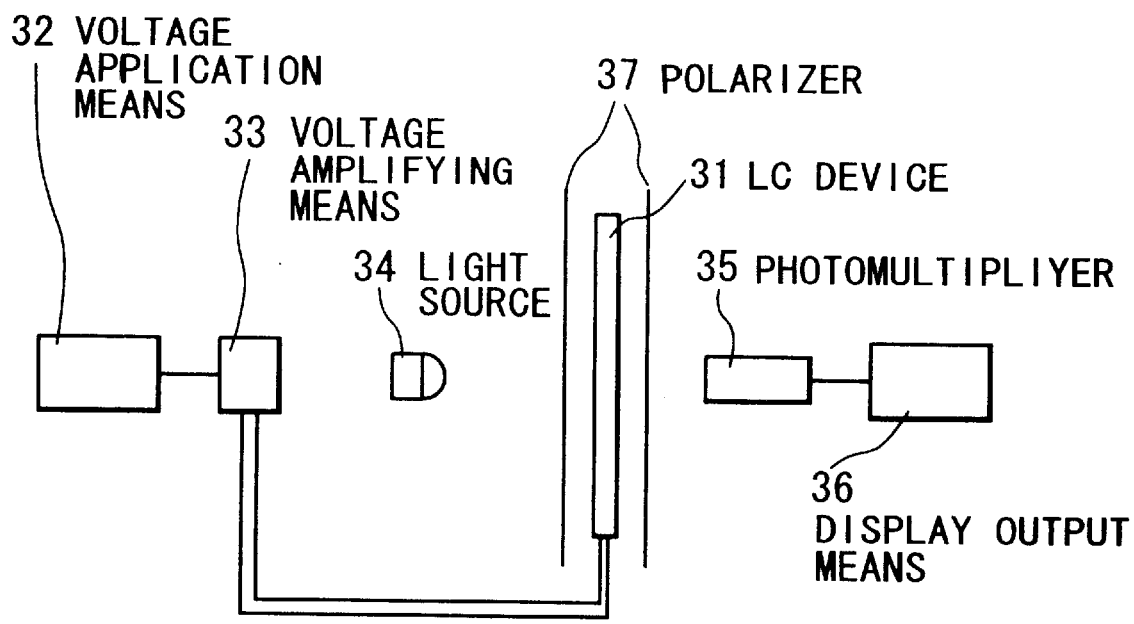
FIG. 2 is a schematic sectional view of an evaluation apparatus for the liquid crystal device of the present invention.

Each of the liquid crystal devices LCD-1 to LCD-12 and the comparative liquid crystal devices LCD-C1 to LCD-C3 was installed in an apparatus for evaluating light-transmission characteristic as shown in FIG. 2.

Referring to FIG. 2, the apparatus includes a liquid crystal device 31 sandwiched between a pair of polarizers 37, as desired. Lead-out electrodes of the liquid crystal devices 31 are connected to a wave generator (voltage application means) 32 ("Model AWG2005", mfd. by Tektronix Co.) via a voltage amplifier (voltage-amplifying means) 33 ("High-speed amplifier Model 4010", mfd. by NF Co.). As a light source 34, a mercury lamp (mfd. by Ushio Denki K.K.) is disposed on one side of the liquid crystal device 31. On the other side of the liquid crystal device 31, ND filters (not shown) and a photomultiplier 35 ("Model H5784-03", mfd. by Hamamatsu Photonics K.K., driven by a high-voltage power supply (not shown)) for detecting a transmitted light quantity (amount of light transmission) are disposed, and an oscilloscope ("Model 2445", mfd. by Tektronix Co.) as a display output means 36 is connected to the photomultiplier 35.

For evaluation of the light transmission characteristic, the transmitted light quantity of the liquid crystal device 31 driven by voltage application was detected by the photomultiplier 35 from which a detection signal was sent to the oscilloscope 36 to display a value of the transmitted light quantity.

More specifically, evaluation was performed through the following steps (1) to (3):

(1) When not actuated, all the liquid crystal devices showed a light scattering state as an initial alignment state. A transmitted light quantity at that time was measured as T1.

(2) When a liquid crystal device was driven under the application of a voltage waveform (10 volts/1 kHz), a display region (where the ITO electrodes were formed in a prescribed pattern) in the light scattering state was changed toward a transparent state to increase a light transmittance thereof. At that time, a transmitted light quantity was measured as T2.

(3) After the lapse of less than 3 seconds from the start of the voltage application, the voltage application was terminated. As a result, a degree of light scattering in the display region was increased to show a transmitted light quantity identical to that in the initial alignment state in the step (1). Accordingly, it was found that all of the liquid crystal devices caused no hysteresis phenomenon.

Further, the liquid crystal devices LCD-1 to LCD-12 (Examples 13–24) showed contrast ratios CR (=T2/T1) which were two to three times that of corresponding comparative liquid crystal devices LCD-C1 to LCD-C3, respectively.

EXAMPLES 25–28

Four liquid crystal devices LCD-13 to LCD-16 were prepared and evaluated in the same manner as in Examples 13–24 except that (a) the liquid crystal compositions LC-5 (Ex. 5), LC-6 (Ex. 6), LC-11 (Ex. 11) and LC-12 (Ex. 12) were used as those for Examples 25, 26, 27 and 28, respectively, and (b) the alignment control film 25 was formed as a monomolecular film by dip-coating of cetyltrimethyl-ammonium bromide (CTAB) for providing a homeotropic alignment state. The evaluation results are shown below.

In Example 25 using the liquid crystal composition LC-5 (Example 5), it was found that the liquid crystal (DF01XX) was homeotropically aligned, and the gel-forming compound (after gelation) was randomly aligned. In Example 26 using the liquid crystal composition LC-6 (Example 6), it was found that the liquid crystal (DF01XX) was homogeneously aligned, and the gel-forming compound was homeotropically aligned.

In order to investigate the difference in alignment behavior more specifically, the respective phase transition behaviors for the liquid crystal compositions LC-5 and LC-6 on temperature decrease from isotropic liquid states were traced.

As a result of the liquid crystal composition LC-5 (Example 25 based on Example 5), it was confirmed that the liquid crystal (DF01XX) first caused phase transition and was affected by the alignment control force of the homeotropic alignment control film to exhibit a homeotropic alignment state; then the gel-forming compound caused phase transition and received the alignment control force of the liquid crystal (DF01XX) and a regulation force of gelation (phase transition into discotic phase) to be placed in a random alignment state as a stable state in terms of energies for these forces. With respect to the liquid crystal composition LC-6 (Example 26 based on Example 6), it was confirmed that the gel-forming compound first caused phase transition and was affected by the alignment control force of the homeotropic alignment control film to exhibit a homeotropic alignment state; then the liquid crystal (DF01XX) caused phase transition and received the alignment control force of the (side chains of) gel-forming compound to be placed in a homogeneous alignment state.

According to these examples, it was found that an alignment state of a substance having a lower phase transition temperature was principally regulated by a substance having a higher phase transition temperature in a liquid crystal device using a liquid crystal composition comprising the lower and higher phase transition temperature substances.

Optical Characteristic

Each of the liquid crystal devices LCD-13 to LCD-16 and a comparative liquid crystal device LCD-C4 (using only the liquid crystal (CF01XX) as a liquid crystal material) was then subjected to evaluation of light transmission characteristic.

More specifically, evaluation was performed through the following steps (1) to (4):

(1) When the liquid crystal devices LCD-13 and LCD-14 were not actuated, the devices showed a light transmission state as an initial alignment state. When the liquid crystal device LCD-C4 was not actuated, a light transmission state was observed, but the state was somewhat turbid.

(2) When the liquid crystal devices LCD-13 and LCD-14 were driven under the application of a voltage waveform (10 volts/1 kHz), a display region (where the ITO electrodes were formed in a prescribed pattern) in the light transmission state was changed into a light scattering state. This state was confirmed as a dynamic scattering (DS) mode by a polarizing microscope observation.

(3) When the frequency (20 kHz) of the applied voltage waveform was gradually increased while keeping the voltage value of 10 volts, the color of each liquid crystal composition was changed to pale pink, pale green and pale blue, respectively. These states were confirmed as such a state that the liquid crystal composition retained a certain alignment state, not as the DS mode, by observation through a microscope using no polarized light. The above phenomenon (change in color of the liquid crystal composition) was not observed in the comparative liquid crystal device LCD-C4 (using only the liquid crystal (DF01XX), i.e., free from the gel-forming compound).

(4) When the voltage (10 kHz) of the applied voltage waveform was gradually increased while keeping the frequency of 20 kHz, the color of each liquid crystal composition was changed to pale pink, pale green and pale blue, respectively. However, a degree of change in color was smaller than the case of increasing the frequency (of the applied voltage waveform) as in step (3). The above phenomenon (change in color of the liquid crystal composition) was not observed in the comparative liquid crystal device LCD-C4 (using only the liquid crystal (DF01XX), i.e., free from the gel-forming compound).

Accordingly, as a result of Examples 25–28, when the liquid crystal composition comprising a liquid crystal and a discotic gel-forming compound according to the present invention was used in a liquid crystal layer of a liquid crystal device, it was found that a state of selective reflection and transmission of light could be controlled by appropriately changing the electrical factors, such as voltage and frequency of the applied electric field. The above-described color change phenomenon of the liquid crystal composition of the present invention may be attributable to a change in the helical pitch of associated molecules of the gel-forming compound allowing a helical structure due to a change in electric field condition and/or a dynamic viscoelasticity due to gelation of the liquid crystal composition.

EXAMPLE 29

Figure 3:
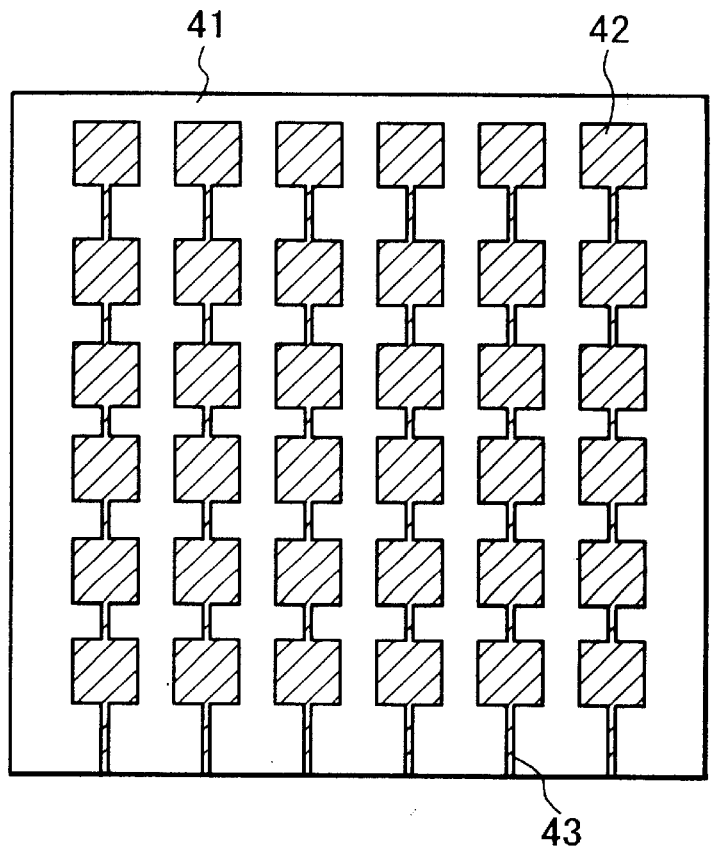
FIG. 3 is a schematic plan view of an embodiment of the liquid crystal device of the present invention.

A liquid crystal device including a pair of substrates each having a structure shown in FIG. 3 was prepared.

Referring to FIG. 3, each substrate comprises a glass substrate 41 (100×100 mm) on which a 200–300 $\mu$m-thick transparent electrode of ITO including a plurality of pixel portions 42 (each having a size of 8×8 mm) and corresponding lead-out portions 43 (width=1–2 mm) was formed in a pattern.

Each of the pair of substrates was subjected to homeotropic alignment treatment in the same manner as in Examples 25–28. Then, on one of the substrates, a thermosetting resin was applied by printing at a portion free from the ITO electrode, and the pair of substrates was applied to each other by pressure bonding to prepare a matrix blank cell.

Into the blank cell, the liquid crystal composition LC-6 was injected in the same manner as in Example 26 to prepare a liquid crystal device LCD-17.

Figure 4:
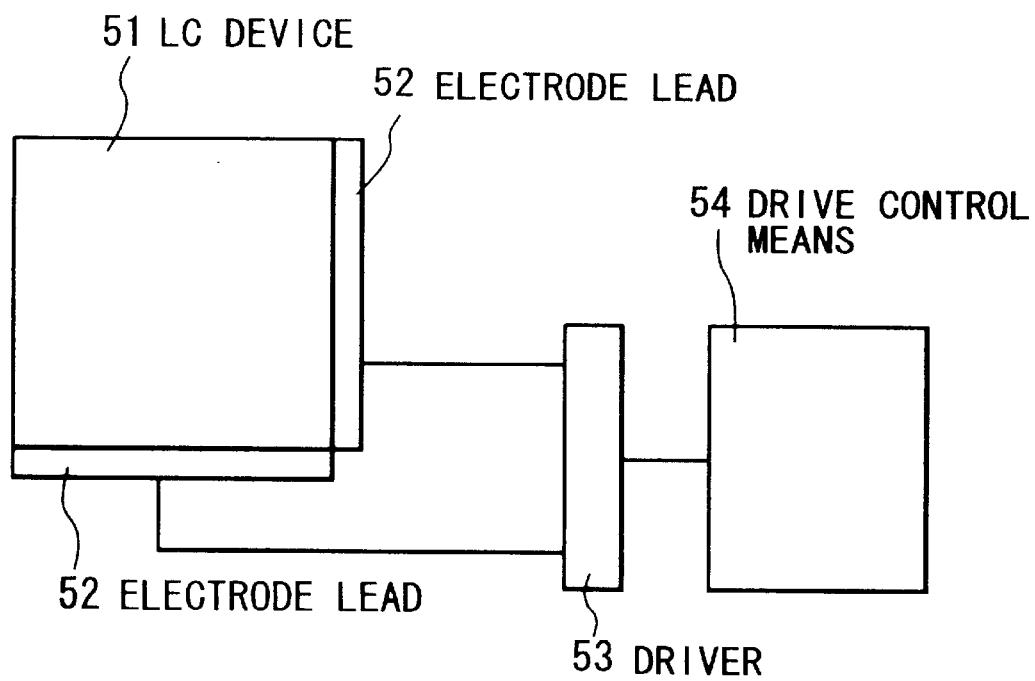
FIG. 4 is a schematic illustration of the liquid crystal display apparatus of the present invention.

By using the liquid crystal device LCD-17, a liquid crystal display apparatus as shown in FIG. 4 was prepared.

Referring to FIG. 4, the liquid crystal display apparatus includes a liquid crystal device 51 (LCD-17), lead-out electrodes 52, a driver 53 for driving the liquid crystal device 51, and a drive control means 54.

When a voltage waveform (voltage=10 volts) was applied to prescribed pixels while changing its frequency, only the pixels supplied with the voltage waveform caused a change in color as in step (3) of Examples 25–28.

EXAMPLE 30

A liquid crystal display apparatus was prepared and evaluated in the same manner as in Example 29 except that an ordinary aluminum reflection plate was closely attached to the liquid crystal device (LCD-17) on one side thereof.

When the voltage application as in Example 29 was conducted, a change in color only at pixels supplied with the voltage waveform was observed from the other side of the liquid crystal device (free from the reflection plate). At other pixels, a reflection display state by the reflection plate was observed.

As described hereinabove, according to the present invention, one (having a higher phase transition temperature) of a liquid crystal and a discotic gel-forming compound (having a supermolecular structure) constituting a liquid crystal composition causes phase transition prior to the other compound (having a lower phase transition temperature) to control an alignment state of the other compound. By using the liquid crystal composition, it becomes possible to provide a liquid crystal device or liquid crystal display apparatus including the liquid crystal composition with an improved contrast and a controlled color display state by electrical control of an applied electric field (e.g., changes in voltage and/or frequency).

What is claimed is:

1. A liquid crystal device comprising:
   a pair of electrodes and a liquid crystal composition disposed between the electrodes,
   wherein the liquid crystal composition comprises at least a liquid crystal and a gel-forming compound forming a gel with the liquid crystal, said gel-forming compound having a discotic liquid crystal phase, and wherein one of the liquid crystal and the gel-forming compound comprises a lower phase transition temperature substance and the other comprises a higher phase transition temperature substance controlling an alignment state of the lower phase transition temperature substance.

2. The composition according to claim 1, wherein the gel-forming compound in the liquid crystal composition has a supermolecular structure comprising a three dimensional structure formed of molecules of the gel-forming compound which are mutually bonded to each other via a non-covalent bond at at least one intermolecular interacting site.

3. The composition according to claim 2, wherein said at least one intermolecular interacting site has at least one —CONH— group.

4. The device according to claim 1, wherein the liquid crystal composition is supplied with an electric field so as to allow control of selective reflection or transmission of light.

5. A liquid crystal apparatus comprising:

a liquid crystal device according to claim 1 or 4 and means for applying an electric field to the liquid crystal device.

6. The device according to claim 1, further comprising an alignment control film, the higher phase transition temperature substance being aligned by the alignment control film.

7. The device according to claim 1, wherein the liquid crystal is the lower phase transition temperature substance, and the gel-forming compound is the higher phase transition temperature substance.

8. The device according to claim 1, wherein the gel-forming compound is the lower phase transition temperature substance, and the liquid crystal is the higher phase transition temperature substance.

9. The device according to claim 1, wherein a light scattering intensity of the liquid crystal device is controlled by applying a voltage to the liquid crystal device.

* * * * *

UNITED STATES PATENT AND TRADEMARK OFFICE
CERTIFICATE OF CORRECTION

PATENT NO. : 6,645,577 B2
DATED : November 11, 2003
INVENTOR(S) : Horikiri

It is certified that error appears in the above-identified patent and that said Letters Patent is hereby corrected as shown below:

Drawings,
Sheet 1 of 2, Fig. 2, "35 PHOTOMULTIPLIYER" should read -- 35 PHOTOMULTIPLIER --.

Column 1,
Line 59, "Sohadt et al.," should read -- Schadt et al., -- and "vol." should read -- SPIE Vol. --.

Column 2,
Line 1, "these documents" should read -- the liquid crystal devices and compositions described in these documents --.

Column 5,
Line 11, "benzendiamide" should read -- benzenediamide --.
Line 13, "olygoethylene" should read -- oligolthylene --.

Column 8,
Lines 35-65, Compound (5) should read:

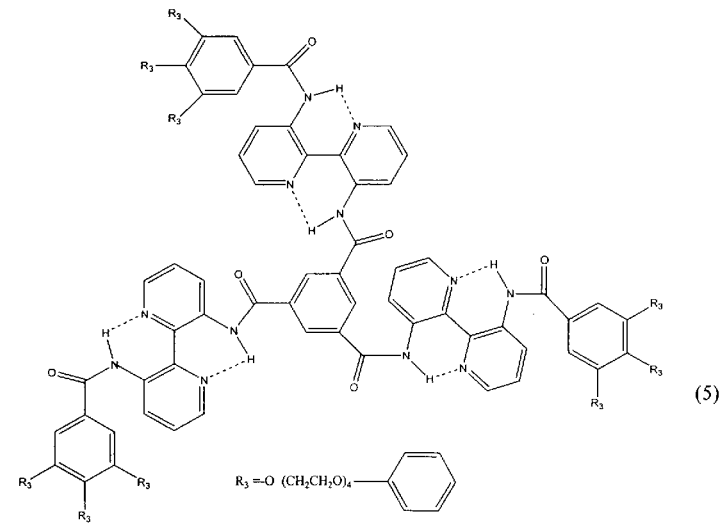

UNITED STATES PATENT AND TRADEMARK OFFICE
CERTIFICATE OF CORRECTION

PATENT NO. : 6,645,577 B2
DATED : November 11, 2003
INVENTOR(S) : Horikiri

It is certified that error appears in the above-identified patent and that said Letters Patent is hereby corrected as shown below:

Column 11,
Line 15, "was" should read -- were --.

Column 13,
Line 18, "homentropic" should read -- homeotropic --.

Column 17,
Lines 9 and 15, "composition" should read -- device --.
Line 11, "three dimensional" should read -- three-dimensional --.

Column 18,
Line 16, "light" should read -- light- --.

Signed and Sealed this

Fourteenth Day of September, 2004

JON W. DUDAS
*Director of the United States Patent and Trademark Office*